(12) United States Patent
Gaeddert et al.

(10) Patent No.: US 11,716,932 B2
(45) Date of Patent: Aug. 8, 2023

(54) SIDE-DISCHARGE TO BAGGING CONVERSION ASSEMBLY FOR MOWER

(71) Applicant: Excel Industries, Inc., Hesston, KS (US)

(72) Inventors: Thomas J. Gaeddert, Hesston, KS (US); Michael L. Webb, Hesston, KS (US)

(73) Assignee: EXCEL INDUSTRIES, INC., Hesston, KS (US)

(*) Notice: Subject to any disclaimer, the term of this patent is extended or adjusted under 35 U.S.C. 154(b) by 247 days.

(21) Appl. No.: 16/795,246

(22) Filed: Feb. 19, 2020

(65) Prior Publication Data
US 2021/0251143 A1 Aug. 19, 2021

(51) Int. Cl.
*A01D 43/063* (2006.01)
*A01D 34/71* (2006.01)
*A01D 101/00* (2006.01)

(52) U.S. Cl.
CPC ......... *A01D 43/0638* (2013.01); *A01D 34/71* (2013.01); *A01D 43/0635* (2013.01); *A01D 2101/00* (2013.01)

(58) Field of Classification Search
CPC ............ A01D 43/0638; A01D 43/0635; A01D 34/71; A01D 34/64; A01D 2101/00; A01D 34/828; A01D 43/0636
See application file for complete search history.

(56) References Cited

U.S. PATENT DOCUMENTS

| | | | | |
|---|---|---|---|---|
| 3,391,524 A * | 7/1968 | Nickoloff | ............. | A01D 34/828 56/320.2 |
| 4,043,102 A * | 8/1977 | Uhlinger | ............ | A01D 43/0631 56/17.4 |
| 5,517,811 A * | 5/1996 | Schaedler | ............ | A01D 43/063 56/202 |
| 5,992,135 A * | 11/1999 | Benway | ................. | A01D 34/71 56/200 |
| 6,910,322 B2 * | 6/2005 | Schroeder | .............. | A01D 43/06 56/202 |
| 6,931,827 B2 * | 8/2005 | Komorida | .......... | A01D 43/0635 56/202 |

(Continued)

OTHER PUBLICATIONS

Accelerator Industries, Accelerator Industries,<https://www.acceleratorindustries.com/#!/home>, 2 pages, Feb. 18, 2020.

(Continued)

*Primary Examiner* — Alicia Torres
(74) *Attorney, Agent, or Firm* — Shook, Hardy & Bacon L.L.P.

(57) ABSTRACT

A mower may have a frame, a cutting deck coupled to the frame, a side discharge opening on a lateral side of the cutting deck, a discharge chute coupled to the lateral side of the cutting deck, a mounting frame coupled proximate the discharge opening, the discharge chute movable between an extended position and a retracted position. A distal end of the discharge chute is spaced away from the side discharge opening in the extended position. The distal end of the discharge chute being positioned such that the top edge of the discharge chute is substantially parallel (e.g., +/-10 degrees) to the mounting frame in the retracted position.

12 Claims, 18 Drawing Sheets

(56) References Cited

U.S. PATENT DOCUMENTS

| | | | | |
|---|---|---|---|---|
| 8,033,086 B2* | 10/2011 | Fukumoto | .......... | A01D 43/0635 56/202 |
| 9,003,753 B2* | 4/2015 | Yamamoto | ......... | A01D 43/0635 56/202 |
| 9,107,343 B1* | 8/2015 | Gaeddert | ................ | A01D 43/06 |
| 9,485,911 B2* | 11/2016 | Thorman | ............. | A01D 42/005 |
| 2018/0054966 A1* | 3/2018 | Volovsek | ........... | A01D 43/0636 |
| 2019/0116732 A1* | 4/2019 | Tada | .................. | A01D 43/0635 |

OTHER PUBLICATIONS

Accelerator Industries, "Accelerator Industries," Web page <https://www.acceleratorindustries.com/>, 5 pages, May 30, 2000, retrieved from the Internet Archive Wayback Machine <https://web.archive.org/web/20000604065405/https://www.accleratorindustries.com/>, retrieved Aug. 19, 2020.

Wright Manufacturing, Inc., Wright Manufacturing, Inc., <http://www.wrightmfg.com/products/accessories>, 13 pages, 2020.

Wright Manufacturing, Inc., Wright Manufacturing, Inc., <http://www.wrightmfg.com/products/accessories> 7 pages, Oct. 26, 2018, retrieved from the Internet Wayback Machine <https://web.archive.org/web/20181026175506/https://www.wrightmfg.com/products/accessories/commercial/> retrieved Aug. 20, 2020.

Humboldt Specialty Manufacturing, Co., Humboldt Specialty Manufacturing, Co., <https://www.grasscatchersusa.com/collection_systems/side_catchers.php#!prettyPhoto> 3 pages, Mar. 14, 2019.

Humboldt Specialty Manufacturing, Co.,, Humboldt Specialty Manufacturing, Co., <https://www.grasscatchersusa.com/collection_systems/side_catchers.php#!prettyPhoto> 2 pages, Mar. 14, 2019, retrieved from the Internet Archive Wayback Machine <https://web.archive.org/web/20190314001756/https://www.grasscatchersusa.com/collection_systems/side_catchers.php> retrieved Aug. 20, 2020.

* cited by examiner

SIDE-DISCHARGE TO BAGGING CONVERSION ASSEMBLY FOR MOWER

FIELD

Aspects provided relate to a mower that may be selectively operated in a side-discharge configuration or a bagging configuration.

BACKGROUND

At a basic level, a mower will include a cutting deck having one or more blades that trim growth on a terrain surface to a desired height. Clippings are dropped to the ground or discharged through a discharge opening in the cutting deck. Clippings discharged through the discharge opening are either dispersed to one side of the mower (e.g., a side-discharge configuration), dispersed rearward of the mower (e.g., a rear-discharge configuration), or communicated to a catcher that retains the clippings for disposal at another location (e.g., a bagging configuration).

Some previous mowers have had the ability to convert from a side-discharge configuration to a bagging configuration. For example, some residential-grade walk-behind mowers have included a discharge opening in the side of the cutting deck. A discharge chute would be attached to the mower proximate the discharge opening to direct the discharge of the clippings in the side-discharge configuration. The discharge chute was removed and a catcher having an inlet port would be attached to the mower to catch the clippings in the bagging configuration. The inlet port of the catcher was positioned proximate the discharge opening in the cutting deck and an outlet port was positioned away from the inlet port, typically opposite the inlet port. Thus, clippings passed from the cutting deck to the catcher through the inlet port and were held in the catcher until dumped out through the outlet port. The inlet port was sized and dimensioned to match the size and dimension of the discharge opening in the cutting deck. The outlet port had a closure to prevent clippings from prematurely exiting the catcher.

These prior convertible mowers, however, required installation of the catcher and removal of one or more additional parts related to a first discharge configuration and removal of the catcher and installation of one or more parts related to a second discharge configuration. The labor, time and expense of converting discharge configurations of prior mowers is undesirable and complex.

SUMMARY

At a high level, a mower may include a catching assembly coupled to a cutting deck that is selectively operable in a bagging configuration where a catcher is coupled to the catching assembly and a side-discharge configuration where the catcher is uncoupled to the catching assembly. The catching assembly may include a mounting plate coupled to the cutting deck, a catcher removably coupled to the mounting plate and comprising a wire frame coupled to a bag, and a discharge chute pivotally coupled to the mounting plate proximate a first opening in the mounting plate. The mounting plate may be coupled to the cutting deck such that the first opening is aligned with a discharge opening in the cutting deck. In the side-discharge configuration, the catcher is uncoupled from the catching assembly and the discharge chute may extend distally from the mounting plate. In the side-discharge configuration, clippings may be communicated from the cutting deck, through the discharge opening, through the first opening, and dispersed out of the discharge chute. In the bagging configuration, the catcher is coupled to the catching assembly and the discharge chute may be pivoted away from the first opening to a retracted position. The catcher may hold the discharge chute in the retracted position. The catcher may have a mouth that both receives clippings from the cutting deck and expels clippings when an operator empties the catcher. The mouth of the catcher may be sized and dimensioned to match the size and dimension of the mounting plate, rather than the first opening. Thus, the mounting plate may define a portion of the space enclosed within the catcher. In the bagging configuration, clippings may be communicated from the cutting deck, through the discharge opening, through the first opening, through a mouth of the catcher, and received in the bag.

In some aspects, the catcher may be pivotally coupled to the mounting plate by one or more members of the wire frame. For example, a crossbar may extend laterally across the top of the catcher and may be received by one or more pivotal mountings on the mounting plate. When coupled to the mounting plate in this way, the bottom of the catcher may be tilted away from the mounting plate to dump the received clippings while still holding the discharge chute in the retracted position. One or more sensors may be used to determine if a blade of the cutting deck is turning, if the catcher is coupled to the mounting plate, and if the catcher is tilted away from the mounting plate, which may expose a portion of the discharge opening. If the one or more sensors determine that the blade is turning, the catcher is coupled, and the catcher is tilted away exposing a portion of the discharge opening, then the mower may be configured to disconnect the blade from a power supply.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
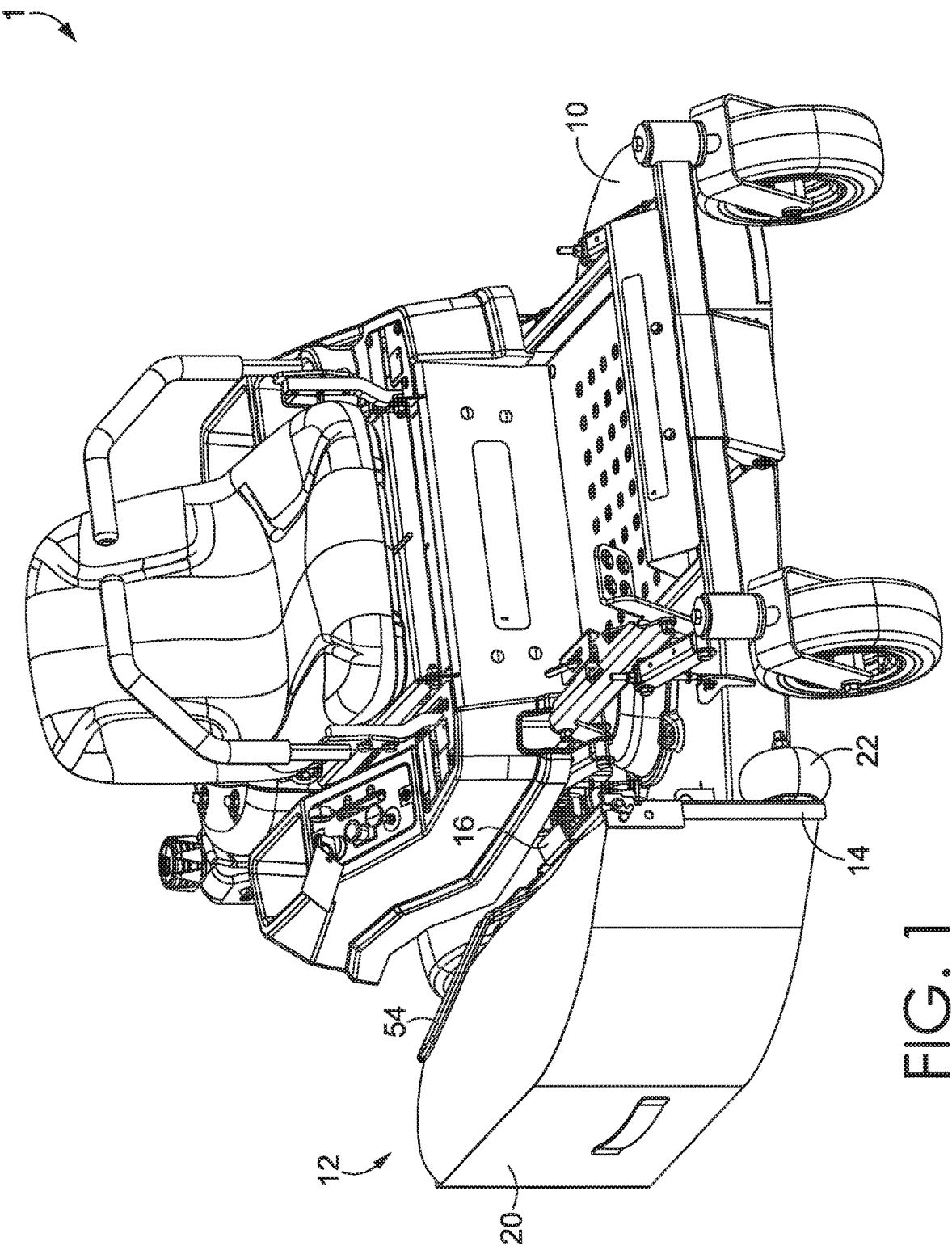
FIG. 1 depicts a perspective view of a mower having a catching assembly coupled to a cutting deck of the mower selectively providing for a side-discharge configuration and a bagging configuration, in accordance with aspects hereof.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other present or future technologies. Further, it should be appreciated that the figures do not necessarily represent an all-inclusive representation of the embodiments herein and may have various components hidden to aid in the written description thereof.

Aspects hereof may be described using directional terminology. For example, the Cartesian coordinate system may be used to describe positions and movement or rotation of the features described herein. Accordingly, some aspects may be described with reference to three mutually perpendicular axes. The axes may be referred to herein as lateral, longitudinal, and vertical, and may be indicated by reference characters X, Y, and Z, respectively, in the accompanying figures. For example, the terms "vertical" and "vertically" as used herein refer to a direction perpendicular to each of the lateral and longitudinal axes. Additionally, relative location terminology will be utilized herein. For example, the term "proximate" is intended to mean on, about, near, by, next to, at, and the like. Therefore, when a feature is proximate another feature, it is close in proximity but not necessarily exactly at the described location, in some aspects. Additionally, the term "distal" refers to a portion of a feature herein that is positioned away from a midpoint of the feature.

At a high level, a mower may include a catching assembly coupled to a cutting deck that is selectively operable in a bagging configuration where a catcher is coupled to the catching assembly and a side-discharge configuration where the catcher is uncoupled to the catching assembly. The catching assembly may include a mounting plate coupled to the cutting deck, a catcher removably coupled to the mounting plate and comprising a wire frame coupled to a bag, and a discharge chute pivotally coupled to the mounting plate proximate a first opening in the mounting plate. The mounting plate may be coupled to the cutting deck such that the first opening is aligned with a discharge opening in the cutting deck. In the side-discharge configuration, the catcher is uncoupled from the catching assembly and the discharge chute may extend distally from the mounting plate. For example, the discharge chute may extend distally away from the mounting plate +/−10 degrees from normal to the mounting plate. In the side-discharge configuration, clippings may be communicated from the cutting deck, through the discharge opening, through the first opening, and dispersed out of the discharge chute. In the bagging configuration, the catcher is coupled to the catching assembly and the discharge chute may be pivoted away from the first opening to a retracted position. The catcher may hold the discharge chute in the retracted position. The catcher may have a mouth that both receives clippings from the cutting deck and expels clippings when an operator empties the catcher. The mouth of the catcher may be sized and dimensioned to match the size and dimension of the mounting plate, rather than the first opening. Thus, the mounting plate may define a portion of the space enclosed within the catcher. In the bagging configuration, clippings may be communicated from the cutting deck, through the discharge opening, through the first opening, through a mouth of the catcher, and received in the bag.

In some aspects, the catcher may be pivotally coupled to the mounting plate by one or more members of the wire frame. For example, a crossbar may extend laterally across the top of the catcher and may be received by one or more pivotal mountings on the mounting plate. When coupled to the mounting plate in this way, the bottom of the catcher may be tilted away from the mounting plate to dump the received clippings while still holding the discharge chute in the retracted position. One or more sensors may be used to determine if a blade of the cutting deck is turning, if the catcher is coupled to the mounting plate, and if the catcher is tilted away from the mounting plate, which may expose a portion of the discharge opening. If the one or more sensors determine that the blade is turning, the catcher is coupled, and the catcher is tilted away exposing a portion of the discharge opening, then the mower may be configured to disconnect the blade from a power supply.

In the figures that follow, the mower will be described in reference to a particular embodiment of a zero-turn riding mower. However, the illustrated embodiment is merely one aspect of the present invention, which may be employed on numerous other types of mowers having a side-discharge opening in a cutting deck (e.g., a stand-on mower, a walk-behind mower, a non-zero turn riding mower, etc.).

Turning now to the figures generally, and in particular to FIG. 1, a mower 1 having a cutting deck 10 is depicted in a bagging configuration where a catching assembly 12 is coupled to the cutting deck 10. The catching assembly 12 includes a mounting plate 14, a discharge chute 16 (best seen in FIGS. 2-4) pivotally coupled to the mounting plate 14 proximate a first opening 18 (shown in FIGS. 2-4) in the mounting plate 14, a catcher 20 removably coupled to the mounting plate 14, and a caster wheel 22 coupled to the mounting plate 14. The mower 1 may selectively be converted from the bagging configuration (FIG. 1) to a side-discharge configuration (FIGS. 3 and 4) by removing the catcher 20.

Figure 2:
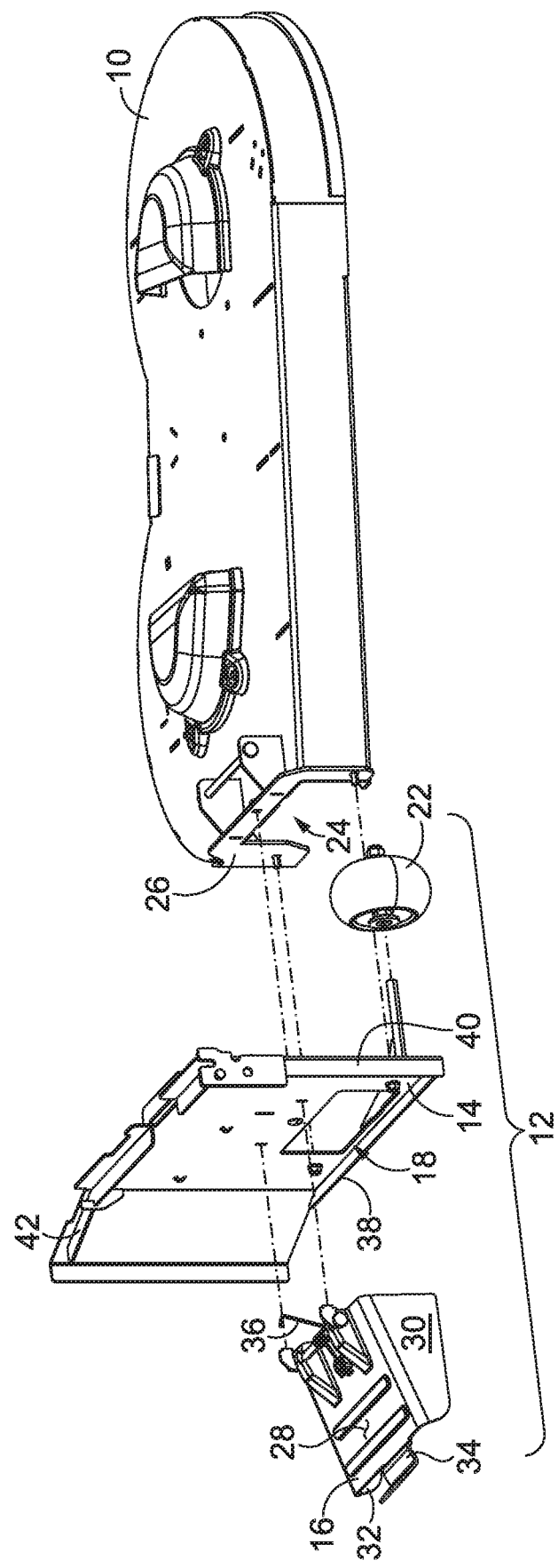
FIG. 2 depicts an exploded view of the catching assembly and the cutting deck of FIG. 1, in accordance with aspects hereof.

An exploded view of the cutting deck 10 and the catching assembly 12 is shown in FIG. 2. The catcher 20 is not shown, nor are other portions of the mower 1, for sake of clarity. The cutting deck 10 is a two-blade cutting deck having a side-discharge opening 24. In other aspects, the cutting deck 10 may have any number of blades (e.g., only one blade, three or more blades, etc.). Although the illustrated side-discharge opening 24 is positioned on a right side of the cutting deck 10, the following description applies equally to a discharge opening located at any point around the cutting deck 10 (e.g., on a forward side, a rear side, a left side, etc.). For sake of brevity, however, the remainder of the description will only discuss the cutting deck 10 having the side-discharge opening 24.

In some aspects, the mower 1 may include the catching assembly 12 when manufactured. In other aspects, the catching assembly 12 may be an after-market upgrade for existing mowers. For example, an existing side-discharge mower may include a side-discharge chute (not shown) pivotally coupled to the cutting deck 10 proximate the side-discharge opening 24. In some aspects, the existing side-discharge chute may be reused as the discharge chute 16 as discussed herein. A perimeter flange 26 surrounds a portion of the side-discharge opening 24.

The mounting plate 14 may be coupled to the cutting deck 10 at the perimeter flange 26. For example, the mounting plate 14 may be bolted to the perimeter flange 26 such that the first opening 18 in the mounting plate 14 is aligned with the side-discharge opening 24 of the cutting deck 10. The first opening 18 may have a similar shape and size to that of the side-discharge opening 24.

Figure 3:
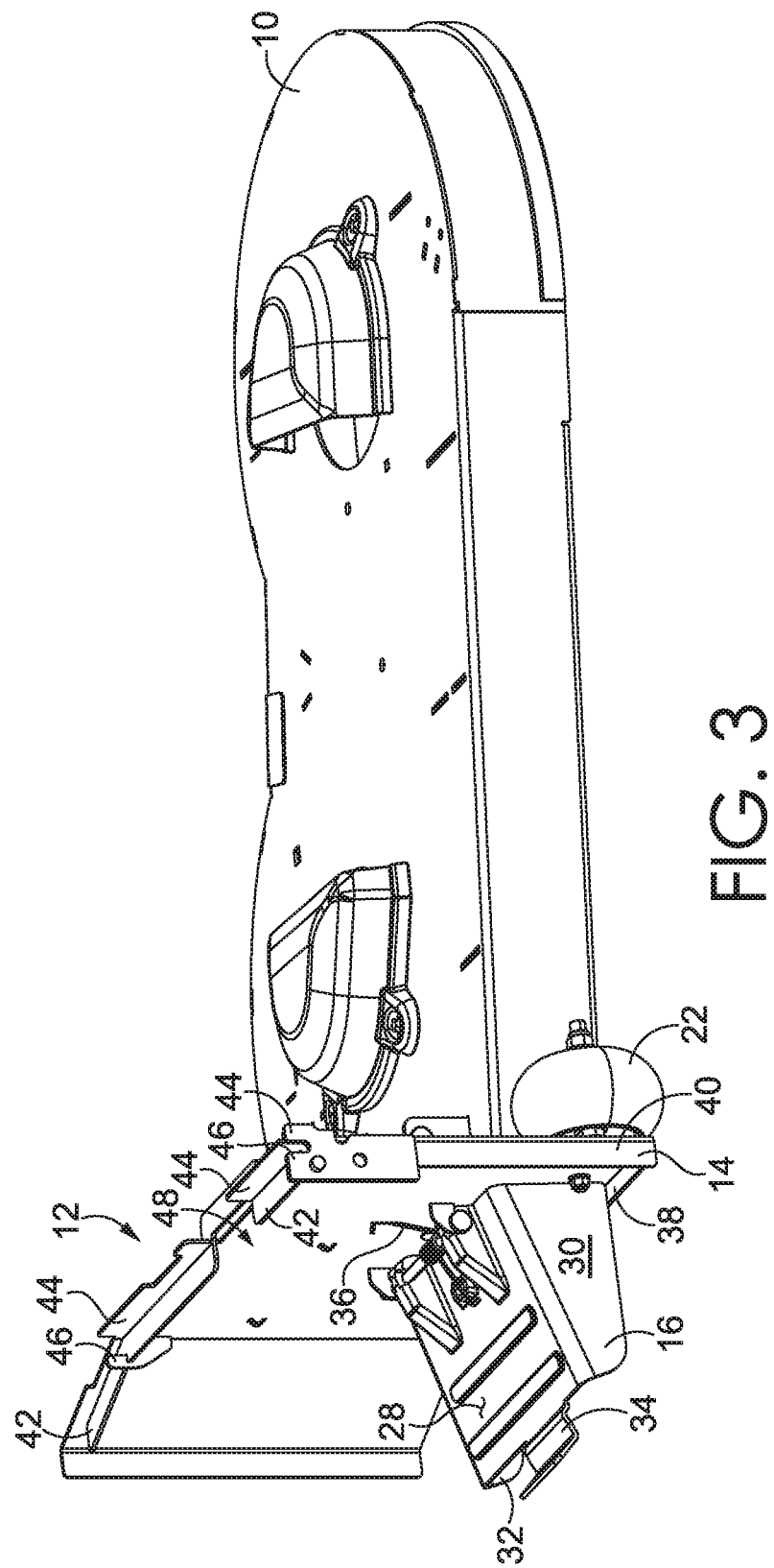
FIG. 3 depicts a perspective view of the catching assembly and the cutting deck of FIG. 1 with a catcher uncoupled to a mounting plate and a discharge chute in a deployed state, in accordance with aspects hereof.
Figure 4:
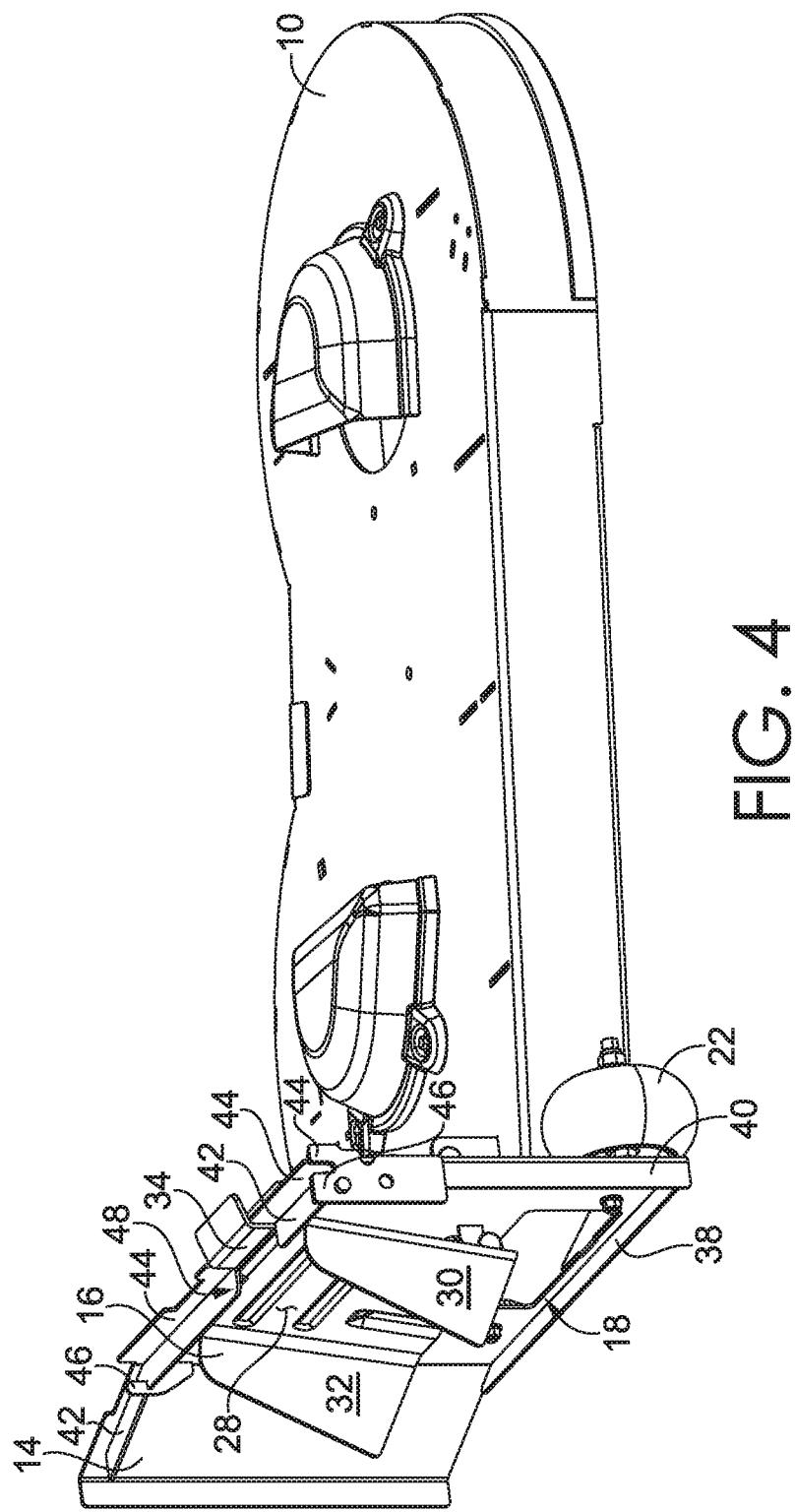
FIG. 4 depicts a perspective view of the catching assembly and the cutting deck of FIG. 1 with the catcher uncoupled to the mounting plate and the discharge chute in a retracted state, in accordance with aspects hereof.

The discharge chute 16 is a channel having a top wall 28, a first side-wall 30, a second side-wall 32, and a retaining panel 34. In other aspects, the discharge chute 16 may comprise other geometries (e.g., other than a channel) so long as it permits clippings to pass therethrough and restricts and/or prevents ingress of objects (e.g., an operator appendage) into the first opening 18 and the side-discharge opening 24 while in a deployed state (as shown in FIG. 3). The retaining panel 34 extends from the top wall 28 and is configured to be held proximate the mounting plate 14 when the discharge chute 16 is in a retracted state (as shown in FIG. 4). In other aspects, the retaining panel 34 may extend from any portion of the discharge chute 16 (e.g., a sidewall). The discharge chute 16 is pivotably coupled to the mounting plate 14 such that it may move between the deployed state and the retracted state. In other aspects, the discharge chute 16 may be movably coupled to the mounting plate 14 such that the discharge chute 16 moves between the deployed state and the retracted state in a manner other than pivoting. A biasing member 36 (e.g., a spring) may bias the discharge chute 16 towards the deployed state.

The caster wheel 22 is rotatably coupled to the mounting plate 14 proximate a forward edge 38 and a bottom edge 40 of the mounting plate 14. The caster wheel 22 prevents the front edge 38, the bottom edge 40, and/or a corner therebetween from contacting a terrain surface when the mower 1 travels over uneven terrain. Such contact could be undesireable and result in gouges in, or other damage to, the terrain surface.

The mounting plate 14 also includes one or more catcher retaining members. The catcher retaining members may comprise a ledge 42 upon which a portion of the catcher 20 is held, one or more first lateral restraints 44 preventing lateral movement of the catcher 20 in a first direction (e.g., in a direction towards the mower 1), and one or more second lateral restraints 46 preventing lateral movement of the catcher 20 in a second direction (e.g., in a direction away from the mower 1). The first direction may be opposite the second direction. Thus, a portion of the catcher 20 may be held on the ledge 42 and received between the one or more first lateral restraints 44 and the one or more second lateral restraints 46.

The mounting plate may include a slot 48 through one or more of the ledge 42, the one or more first lateral restraints 44, and the one or more second lateral restraints 46. In the illustrated aspect, the slot 48 is through the ledge 42 and the first lateral restraint 44. The retaining panel 34 of the discharge chute 16 is received in the slot 48 when the discharge chute is in the retracted position (as shown in FIG. 4).

In FIG. 3, portions of the mower 1 having a catching assembly 12 coupled thereto are shown in the side-discharge configuration. That is, the discharge chute 16 is in the deployed state extending away from the mounting plate 14. The mower 1 may be operated in this configuration and clippings may be discharged from the cutting deck 10 and through the discharge chute 16.

Figure 5:
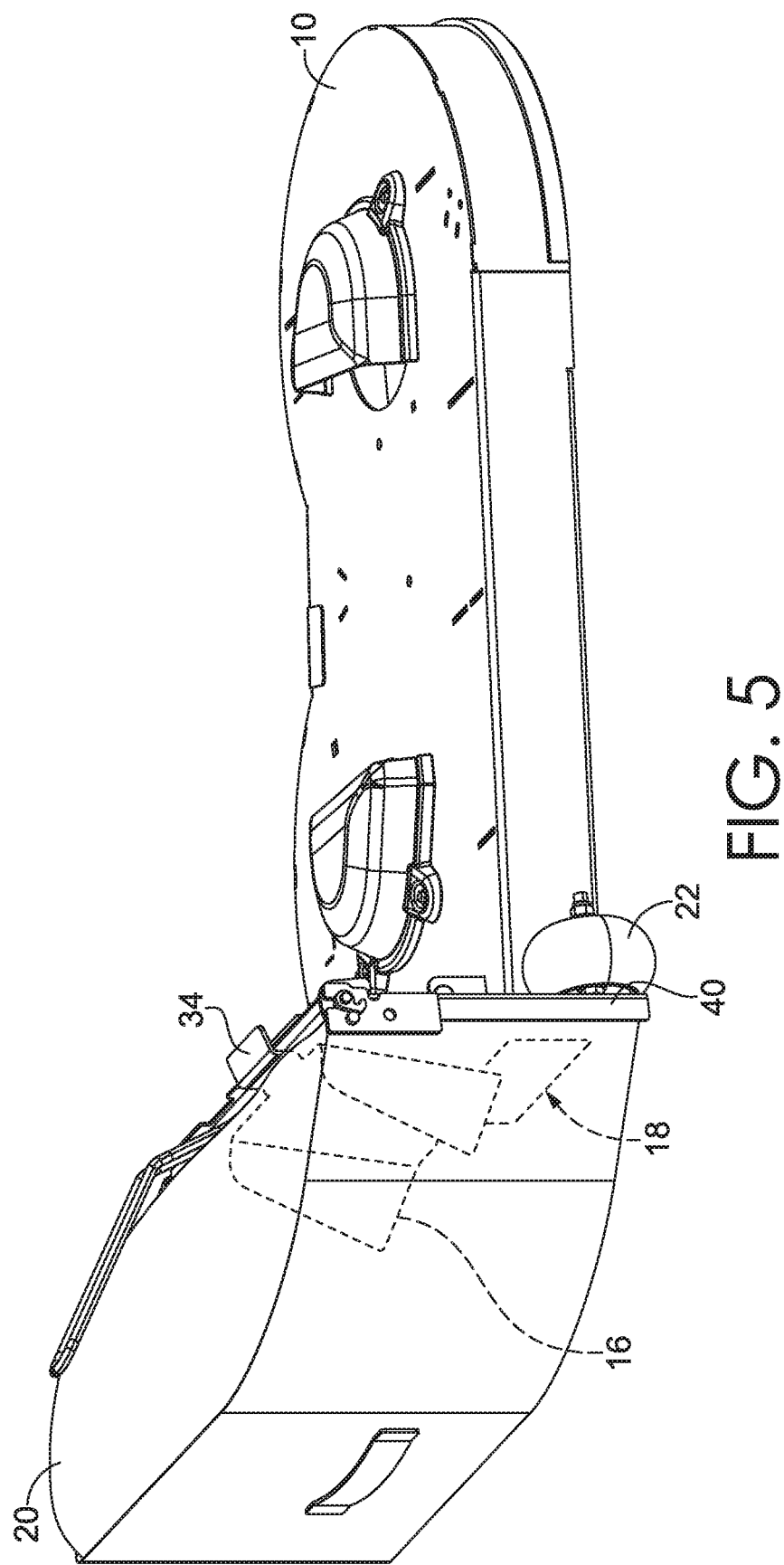
FIG. 5 depicts perspective view of the catching assembly and the cutting deck of FIG. 1 with a catcher coupled to the mounting plate and the discharge chute in the retracted state, in accordance with aspects hereof.
Figure 6:
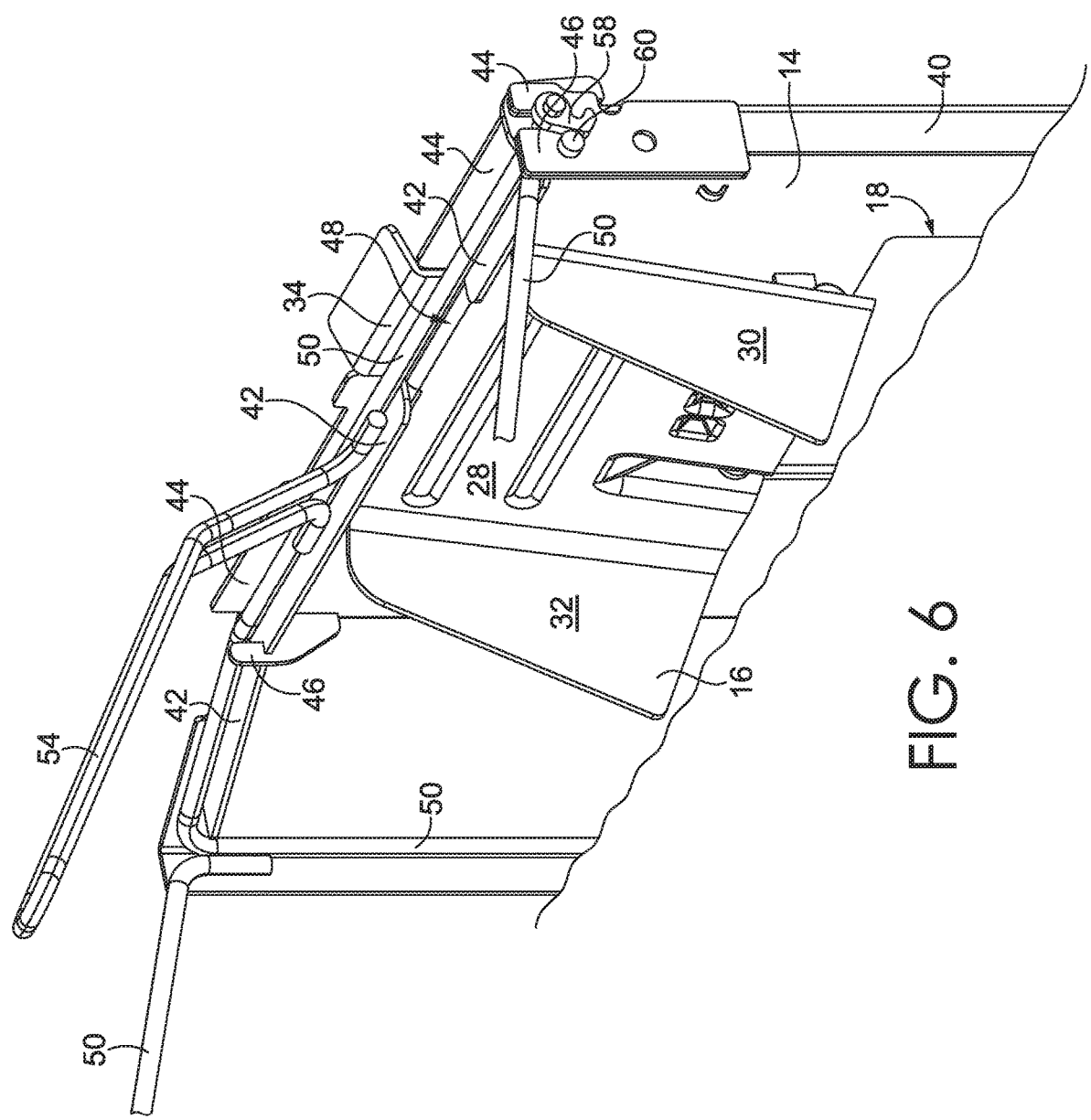
FIG. 6 depicts a detail view of the catching assembly of FIG. 1 with the catcher coupled to the mounting plate, in accordance with aspects hereof.

The mower 1 may be selectively converted to the bagging configuration by coupling the catcher 20 to the mounting plate 14. In order to convert the mower 1 to the bagging configuration, the discharge chute 16 is moved to the retracted state, shown in FIG. 4. Then, the catcher 20 may be removably coupled to the mounting plate 14, as shown in FIG. 5. A portion of the catcher 20 (i.e., a wire frame, a cross-beam, a forward edge, etc.) may engage the retaining panel 34 and hold the discharge chute 16 in the retracted state. For example, the retaining panel 34 may be held between the mounting plate 14 and the catcher 20 (e.g., wire frame, cross-beam, forward edge, etc.). Thus, the discharge chute 16 is substantially maintained in the space enclosed by the catcher 20, as illustrated in FIGS. 5 and 6. For example, as shown in FIG. 5, the discharge chute 16 is substantially maintained within the space enclosed by the catcher 20 except for the retaining panel 34 that extends out of said space.

In the retracted state, the discharge chute 16 may be pivoted such that the distal end is rotated towards the center of the mower such that the top end of the discharge chute 16 is parallel to the mounting plate 14. In some aspects, the top end of the discharge chute 16 is within +/−10 degrees of parallel with the mounting plate 14. In such aspects, the term "parallel" means +/−10 degrees of parallel with the mounting plate 14.

Figure 7:
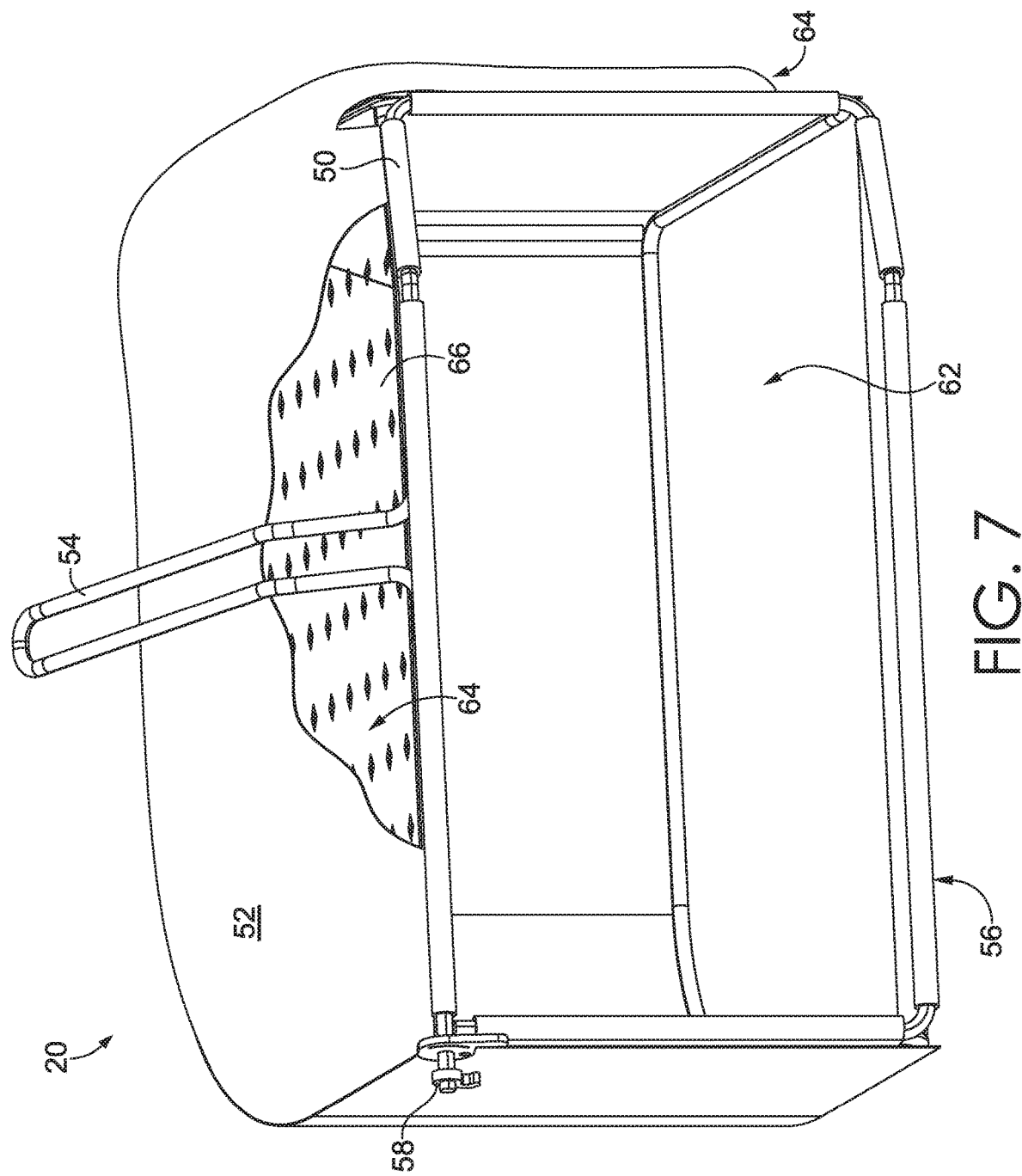
FIG. 7 depicts a perspective view of the catcher of FIG. 1, in accordance with aspects hereof.

Referring to FIG. 7, the catcher 20 includes a wire frame 50 comprised of one or more rods shaped to define a space enclosed by the catcher 20, a bag 52 coupled to the wire frame 50, and a handle 54 extending from the wire frame 50. The catcher 20 also includes a mouth 56 (i.e., an opening not enclosed by the bag 52. The mouth 56 is oriented to face the first opening 18 and the mounting plate 14. The mouth 56 is substantially larger than the first opening 18, and therefore the space enclosed by the catcher is partially covered by the mounting plate 14. This wide-mouth configuration of the catcher 20 simplifies unloading of the bag 52. First, the size of the mouth 56 facilitates easy dumping of the clippings. Second, reassembling the catching assembly 12 after dumping is eased because the catcher 20 is simply coupled back to the mounting plate 14. That is, unlike previous catchers that required a closure to close a second opening in the catcher, the catcher 20 is closed by coupling to the mounting plate 14.

The catcher 20 also includes a flange 58 extending radially from a member of the wire frame 50. In the illustrated aspect shown in FIGS. 6 and 7, the flange 58 is positioned on a portion of the wire frame 50 located proximate the forward edge 40 of the mounting plate 14 when the catcher 20 is coupled to the mounting plate 14. As best seen in FIG. 6, the mounting plate 14 may include a pin 60 that prevents the flange 58 from rotating. Thus, the pin 60 prevents the catcher 20 from rotating about the wire frame 50 held by the ledge 42, first lateral retaining member 44, and second lateral retaining member 46. In other words, the pin 60 keeps the mouth 56 against the mounting plate 14.

Figure 8:
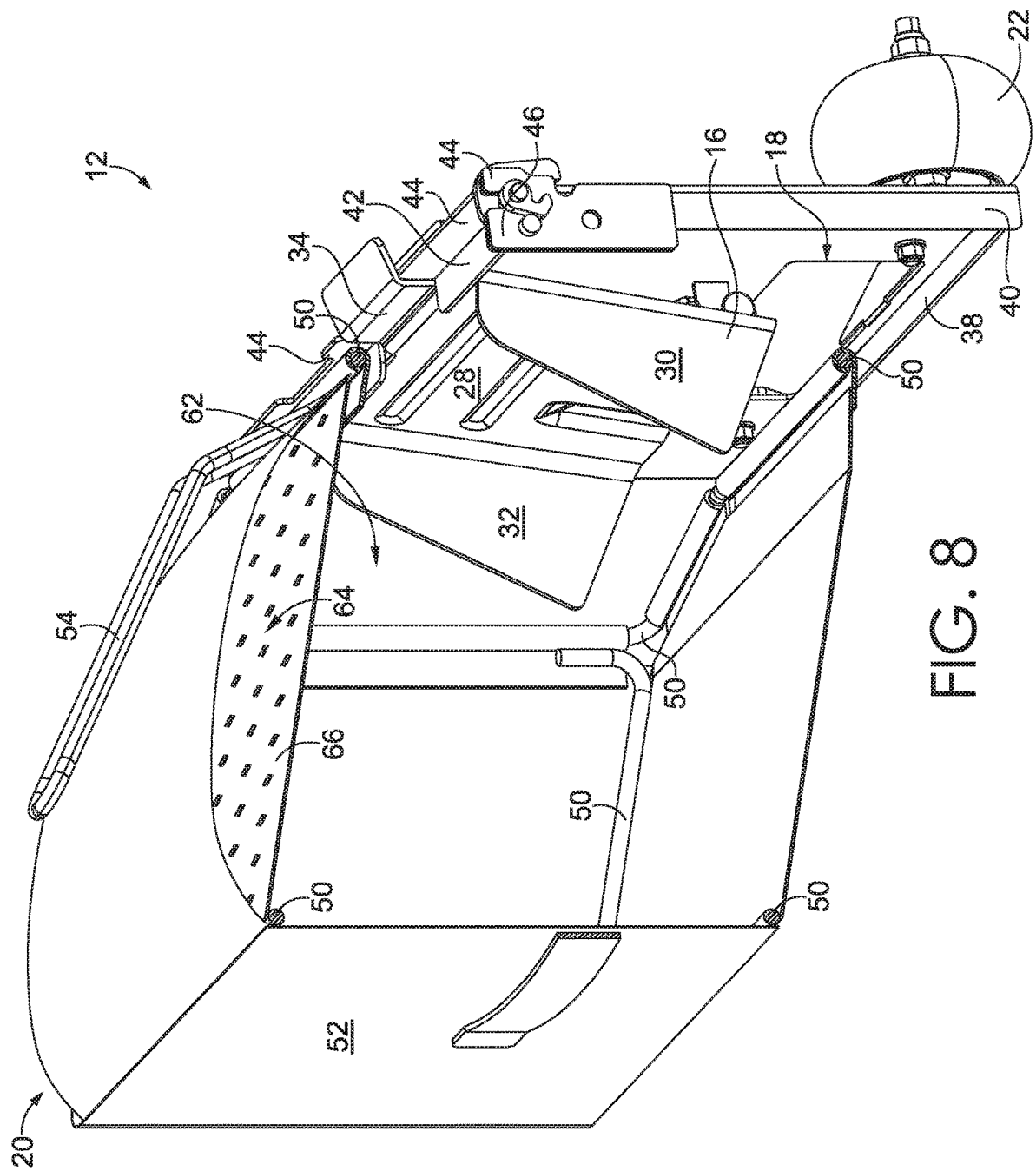
FIG. 8 depicts a perspective view of the catching assembly of FIG. 1, in accordance with aspects hereof.
Figure 9:
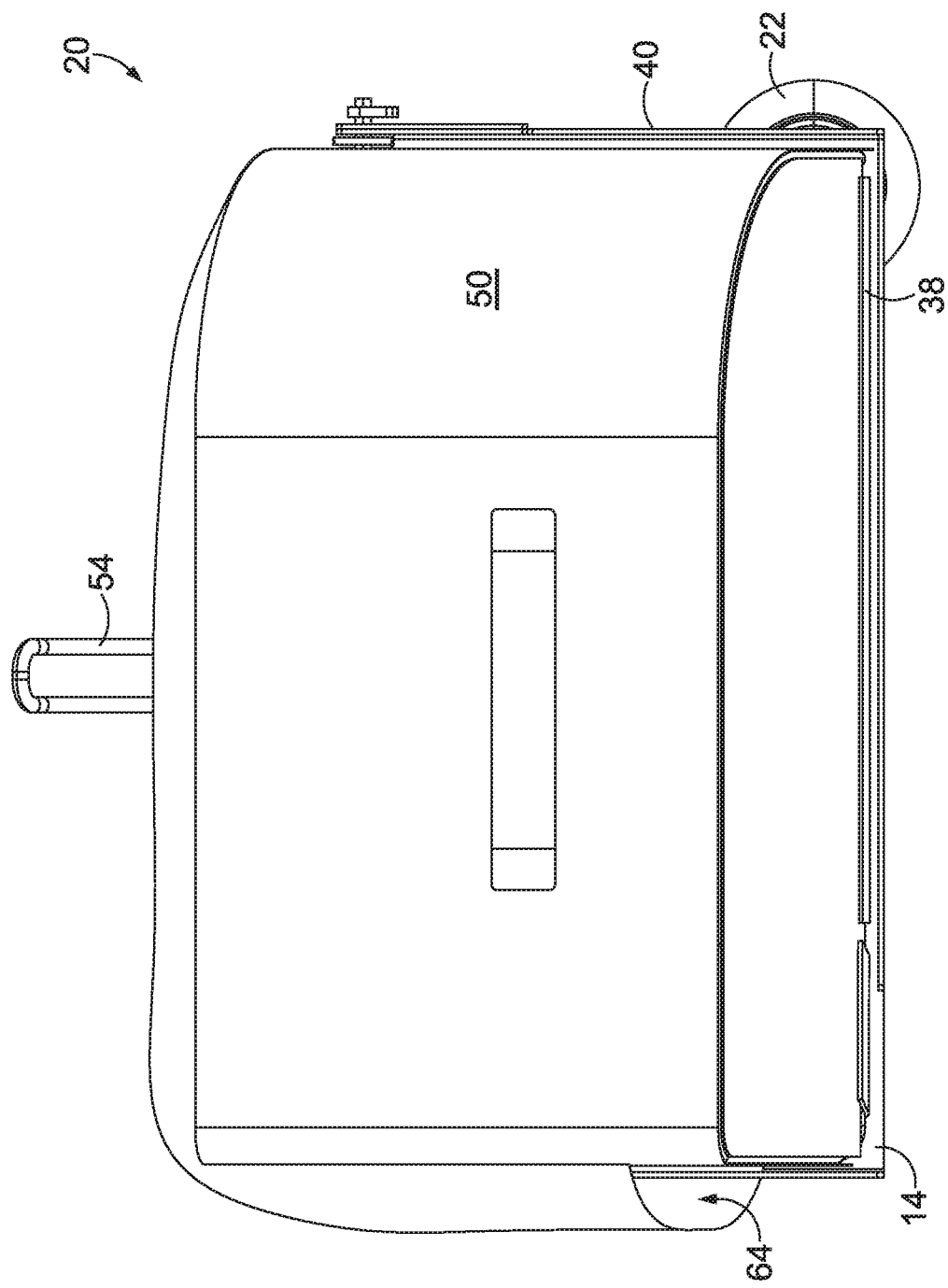
FIG. 9 depicts a side elevation view of the catching assembly of FIG. 1, in accordance with aspects hereof.

Turning now to FIG. 8, a detail view of the catching assembly 12 is shown where the mower 1 is in the bagging configuration. A portion of the catcher 20 has been removed for ease of description. As shown, the space enclosed by the catcher 20 is divided between a clippings hold 62 and an exhaust port 64 by a divider 66. The divider 66 may be a panel of fabric (e.g., meshed fabric) that does not permit clippings to pass through but does permit air to pass through. Thus, during operation the cutting deck 10 communicates clippings and air into the clippings hold 62 of the catcher 20 and the air is further communicated through the divider 66 to the exhaust port 64. When the clippings hold 62 is not full, enough air passes through to the exhaust port 64 such that the exhaust port 64 appears to inflate (as seen in FIGS. 8 and 9). As the clippings hold 62 fills, less air passes through to the exhaust port 64 and as the clippings hold 62 is nearly full, the exhaust port 64 appears to deflate. In operation, the exhaust port 64 appearing to deflate may provide an indication to an operator of the mower 1 that it is time to empty the catcher 20.

In some aspects, the catcher may be removably and pivotably coupled to the mounting plate such that the catcher may be emptied without removing it from the mounting plate. For example, the catcher may be pivotable between a catching position and a dumping position. Thus, in accordance with these aspects, an operator may dump the catcher from their seat on the mower. However, because the one or more blades of the cutting deck may be turning when the catcher is pivoted away from the mounting plate and the first opening and the side-discharge opening may therefore be exposed, it is necessary to provide a way to detect this condition and stop the one or more blades from turning. This may prevent objects from entering the cutting deck through the side-discharge opening or prevent objects from being expelled from the cutting deck through the side-discharge opening. These additional features are illustrated in, and described in reference to, FIGS. 10-21 below Like parts have like reference numbers to those described above.

Figure 10:
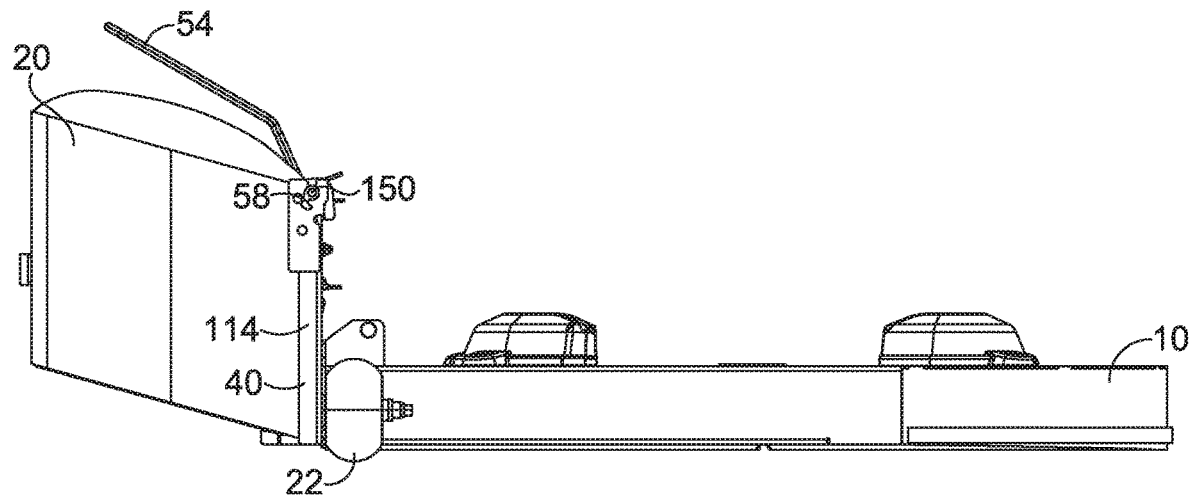
FIG. 10 depicts a front elevation view of a catching assembly coupled to a cutting deck of a mower where the catcher is in a catching position, in accordance with aspects hereof.
Figure 11:
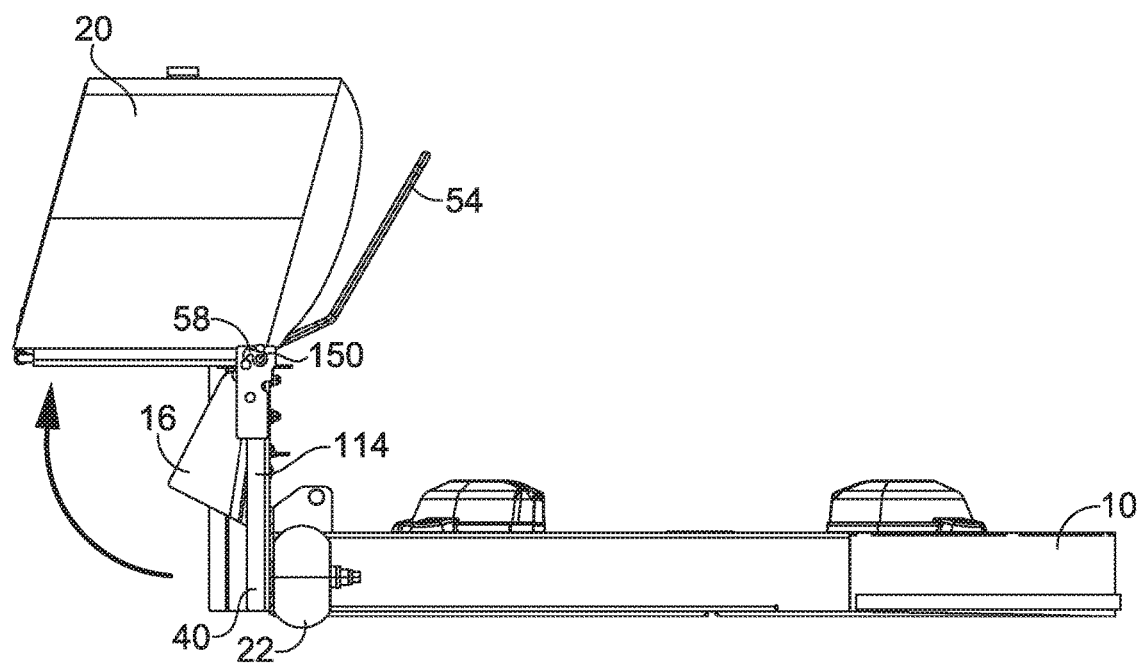
FIG. 11 depicts a front elevation view of the catching assembly coupled to the cutting deck of the mower of FIG. 10 where the catcher is in a dumping position, in accordance with aspects hereof.

FIGS. 10 and 11 illustrate the catcher 20 pivotally coupled to the mounting plate 114. In FIG. 10 the catcher 20 is in the catching position. In FIG. 11, the catcher is in the dumping position. The catcher 20 has been pivoted about the wire frame 50 between FIGS. 10 and 11. For example, the wire frame 50 may include a crossbar 150. The handle 54 may be coupled to the crossbar 150 such that it extends radially therefrom in a lateral direction of the mower 1. Thus, an operator may rotate the handle 54 laterally inward to move the catcher 20 from the catching position to the dumping position.

The mounting plate 114 is substantially similar to the mounting plate 14, however, no pin 60 is present to prevent the flange 58 from rotating. As a result, the catcher 20 may rotate about crossbar 150. Further, one or more sensors are coupled to the mower 1 and are configured to detect at least (1) if the one or more blades of the cutting deck 10 are being supplied power by a power supply of the mower 1, (2) if the catcher 20 is coupled to the mounting plate 114, and (3) if the catcher 20 is in the catching position. If the one or more sensors detect that the one or more blades of the cutting deck 10 are being supplied power by a power supply of the mower 1, and the catcher 20 is coupled to the mounting plate 114, and the catcher 20 is not in the catching position, then the power supplied to the one or more blades of the cutting deck 10 is interrupted.

Figure 12:
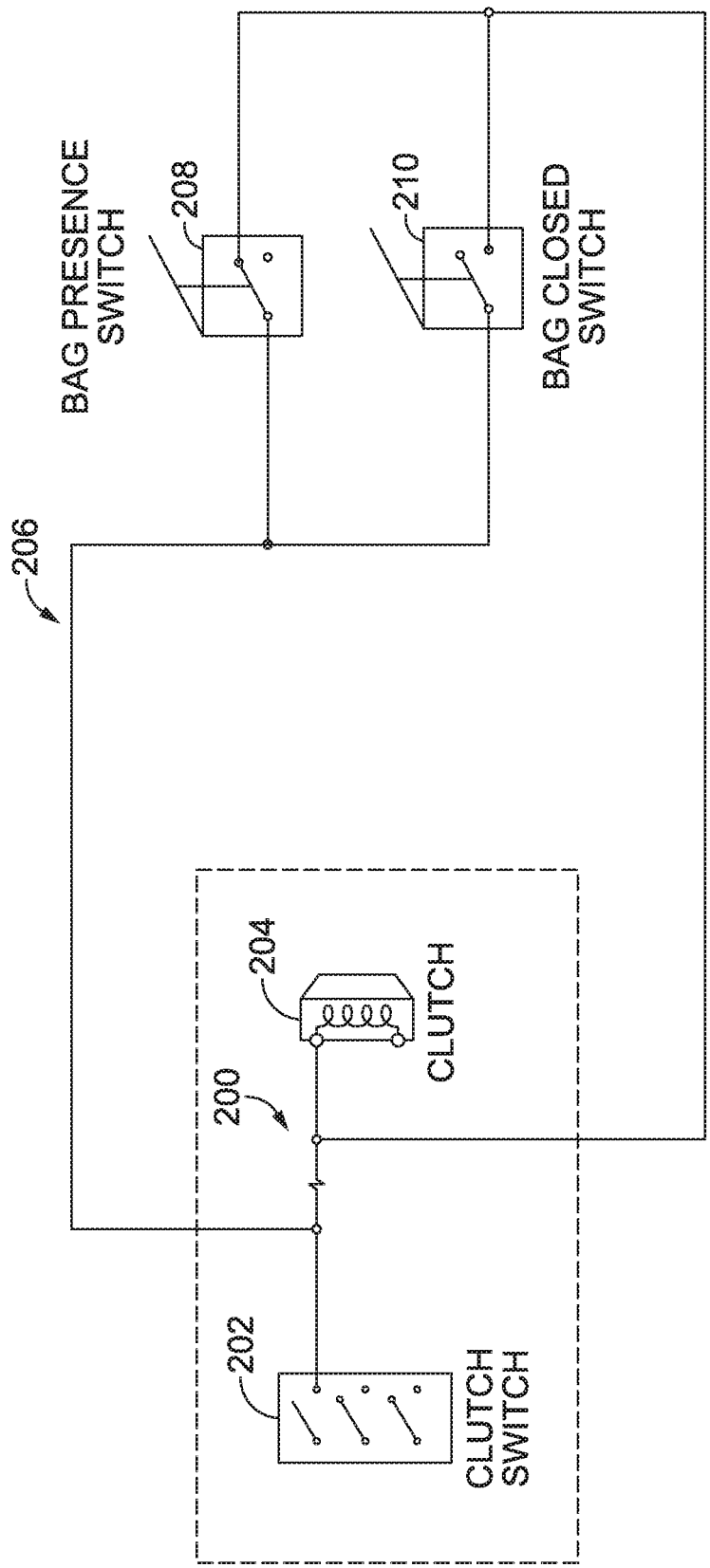
FIG. 12 is an electrical schematic illustrating a bag circuit spliced into a clutch circuit of a mower, in accordance with aspects hereof.
Figure 13:
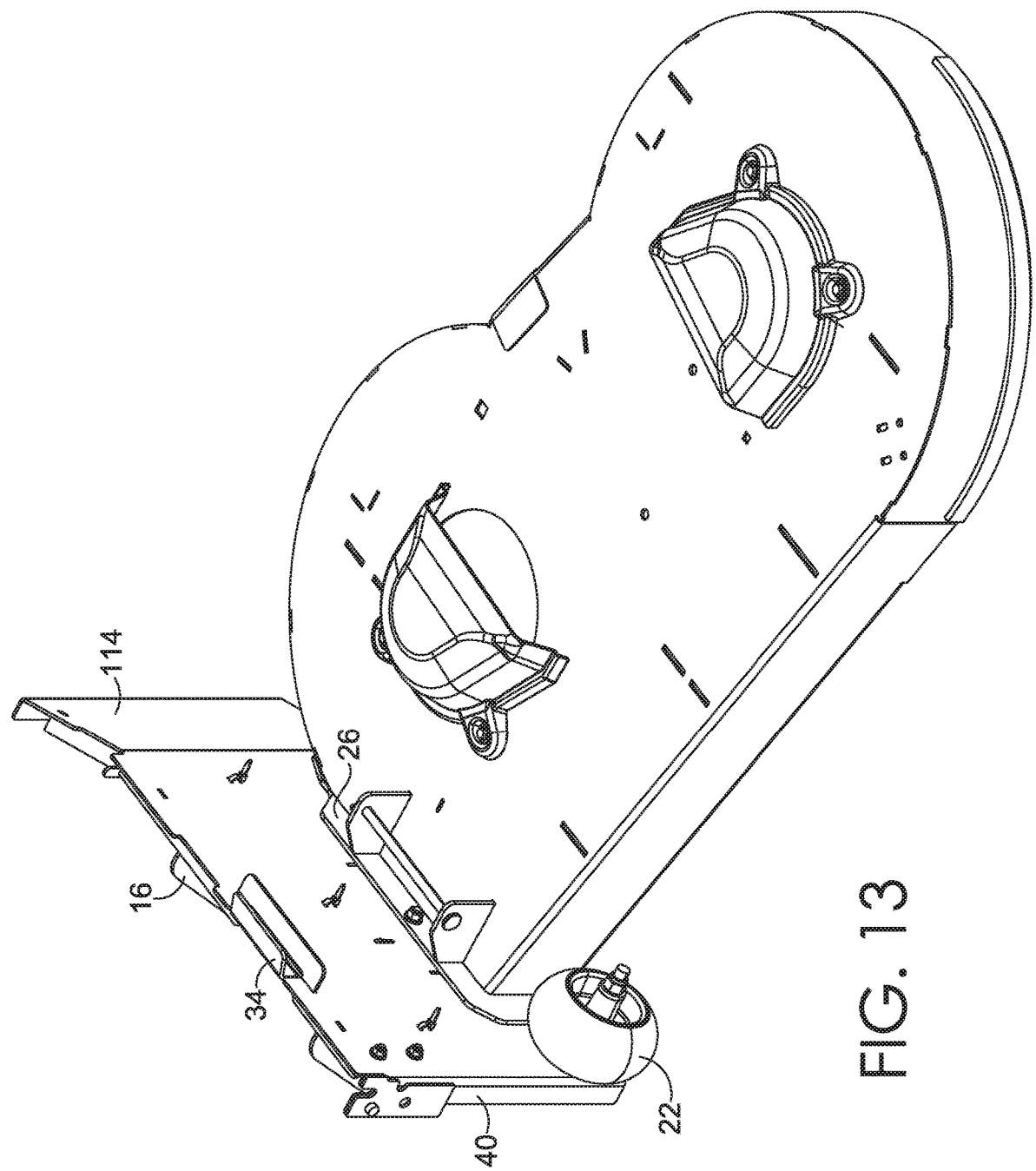
FIG. 13 depicts a perspective view of the catching assembly coupled to the cutting deck of the mower of FIG. 10, in accordance with aspects hereof.
Figure 14:
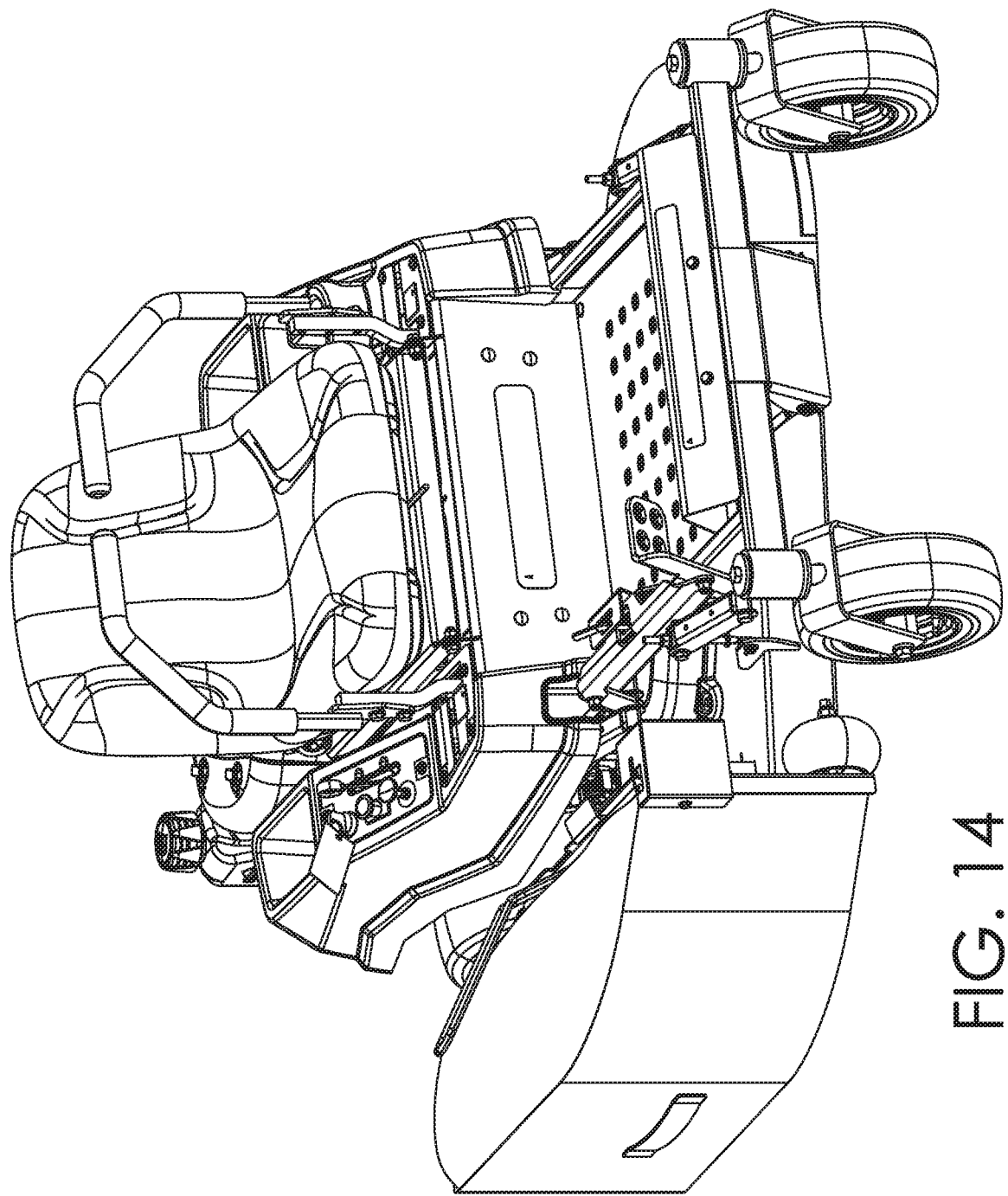
FIG. 14 depicts a perspective view of the mower of FIG. 10, in accordance with aspects hereof.
Figure 15:
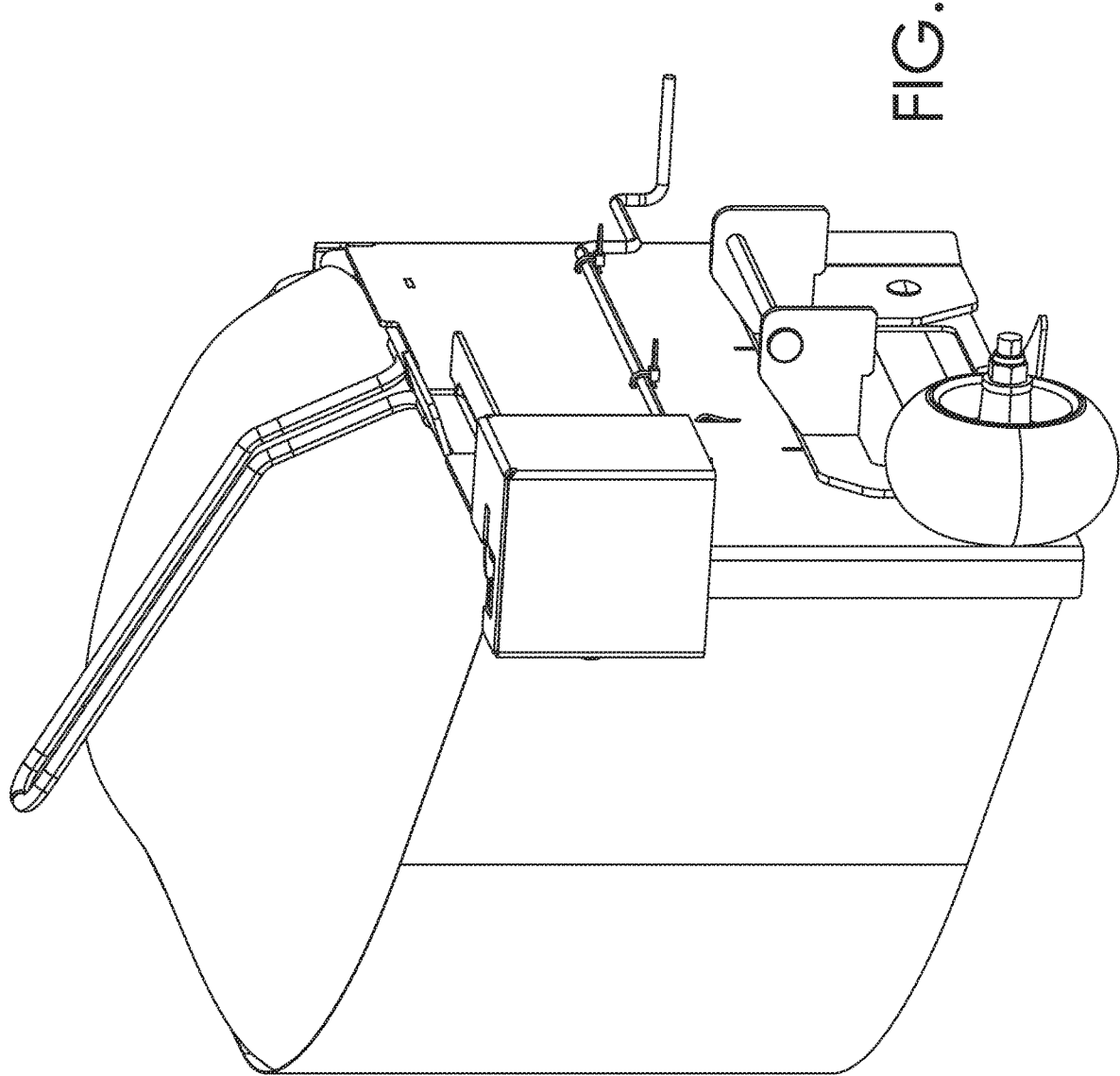
FIG. 15 depicts a perspective view of the catching assembly of the mower of FIG. 10, in accordance with aspects hereof.
Figure 16:
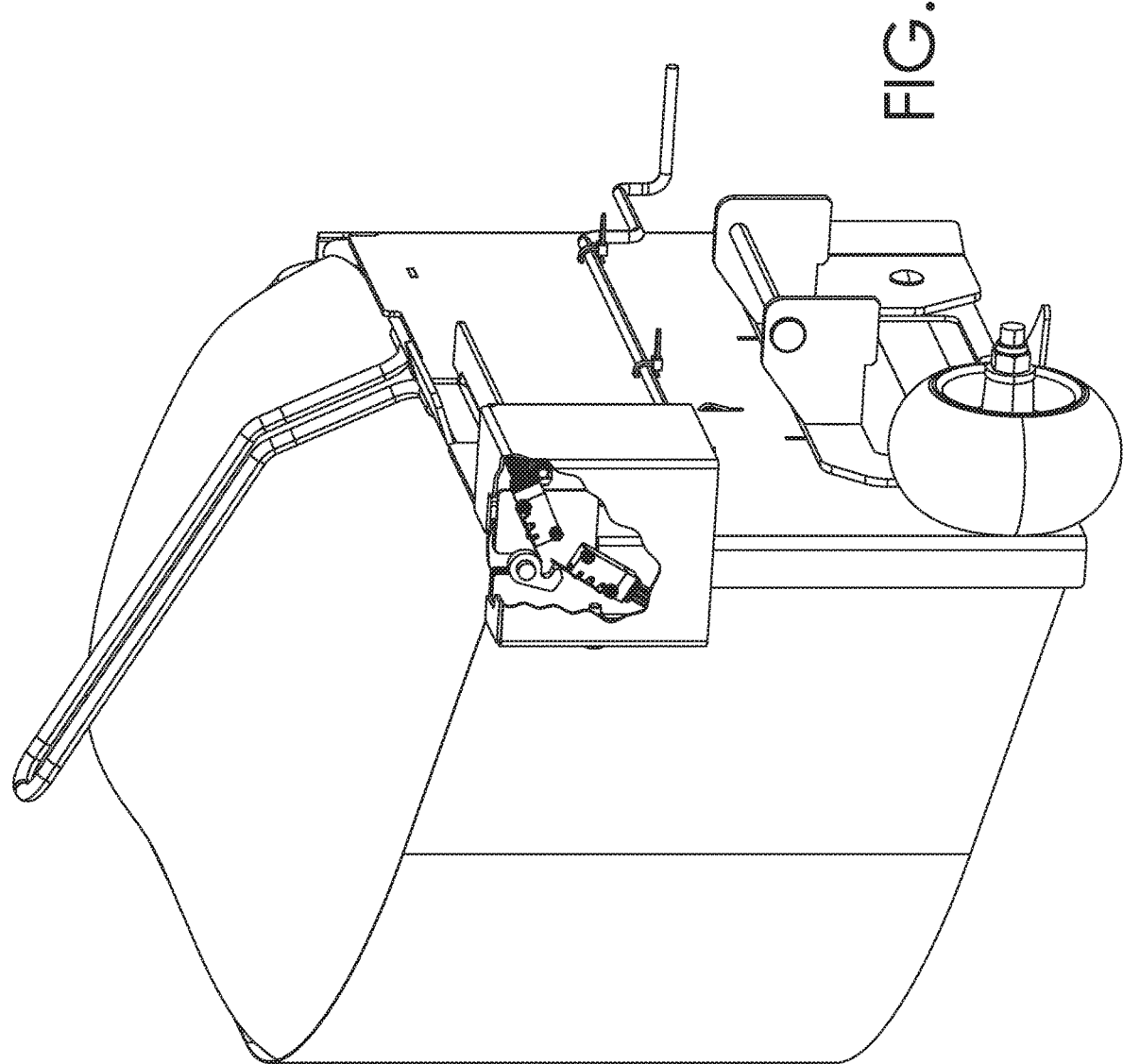
FIG. 16 depicts a perspective view of the catching assembly of the mower of FIG. 10 where a cover has been partially cut away to expose switches enclosed therein, in accordance with aspects hereof.
Figure 17:
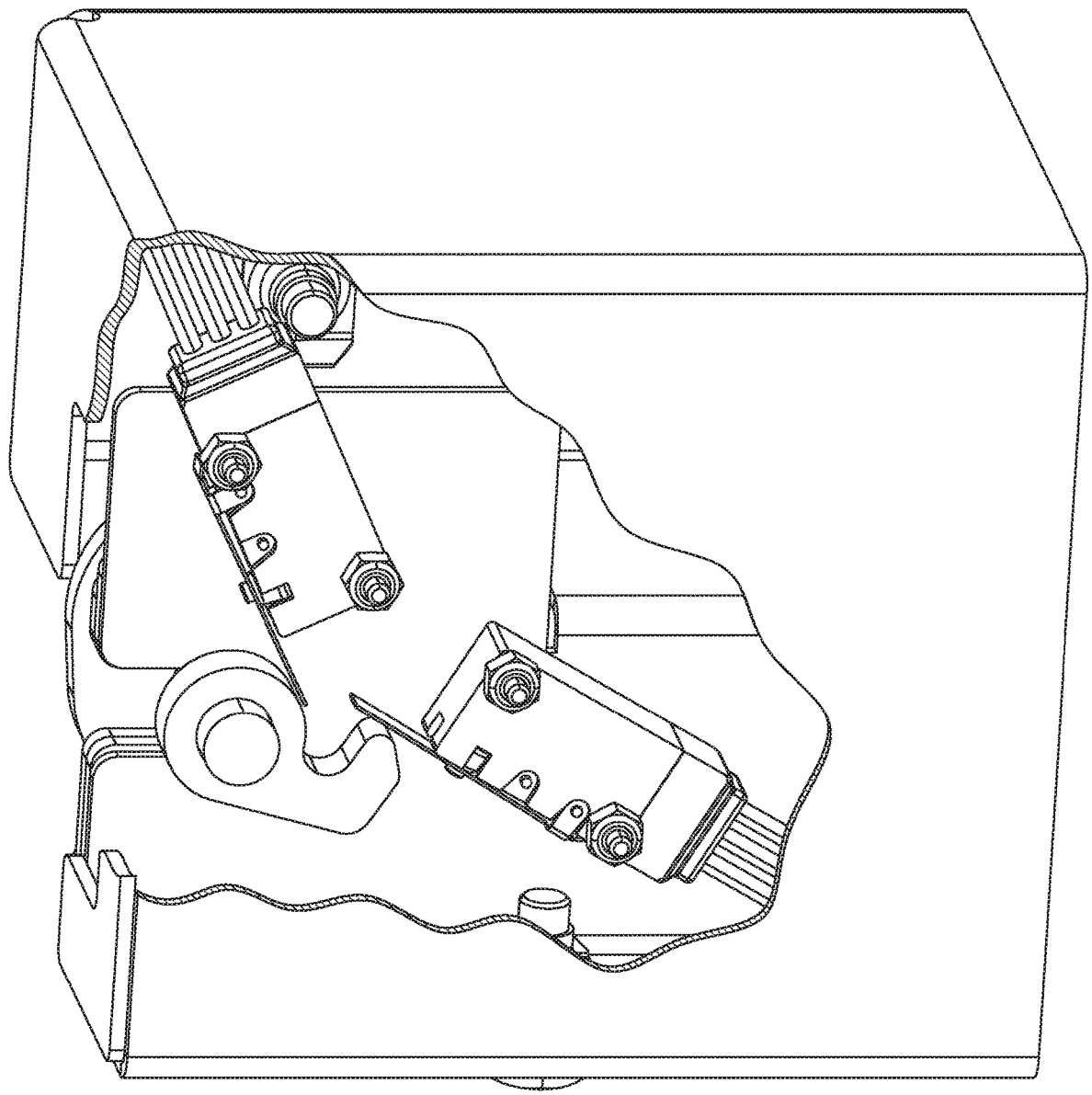
FIG. 17 depicts a perspective view of the switches of FIG. 16 when the catcher is in a catching position, in accordance with aspects hereof.
Figure 19:
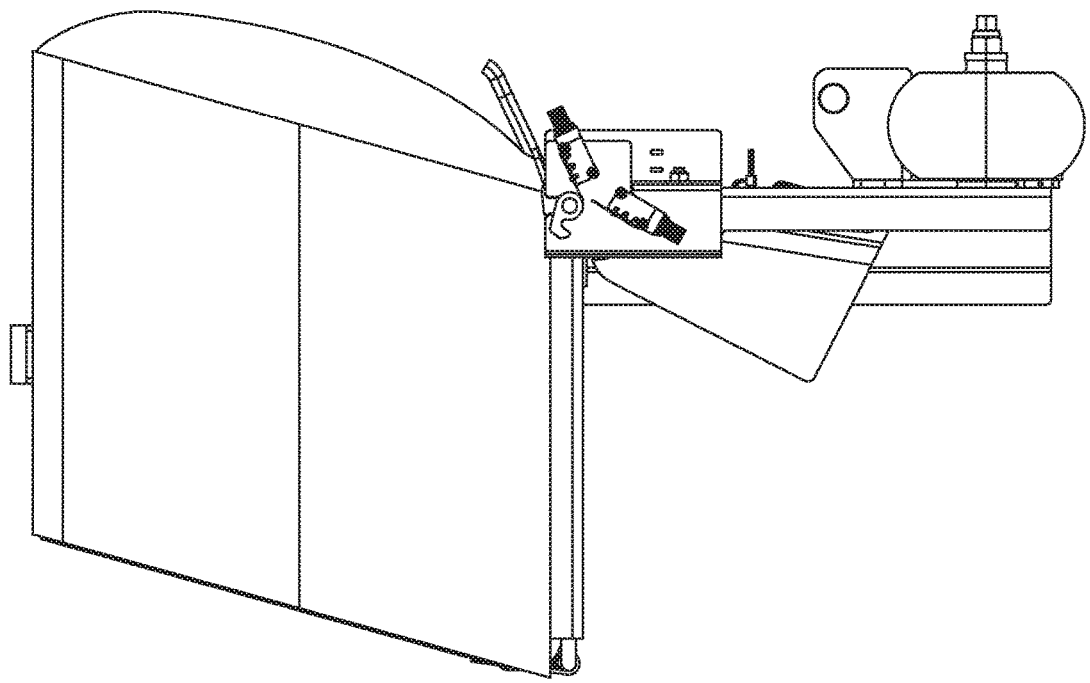
FIG. 19 depicts a front elevation view of the catching assembly coupled to the cutting deck of the mower of FIG. 10 where the cover has been removed to show contact between the flange and one of the switches of FIG. 16 where the catcher is in the dumping position, in accordance with aspects hereof.
Figure 18:
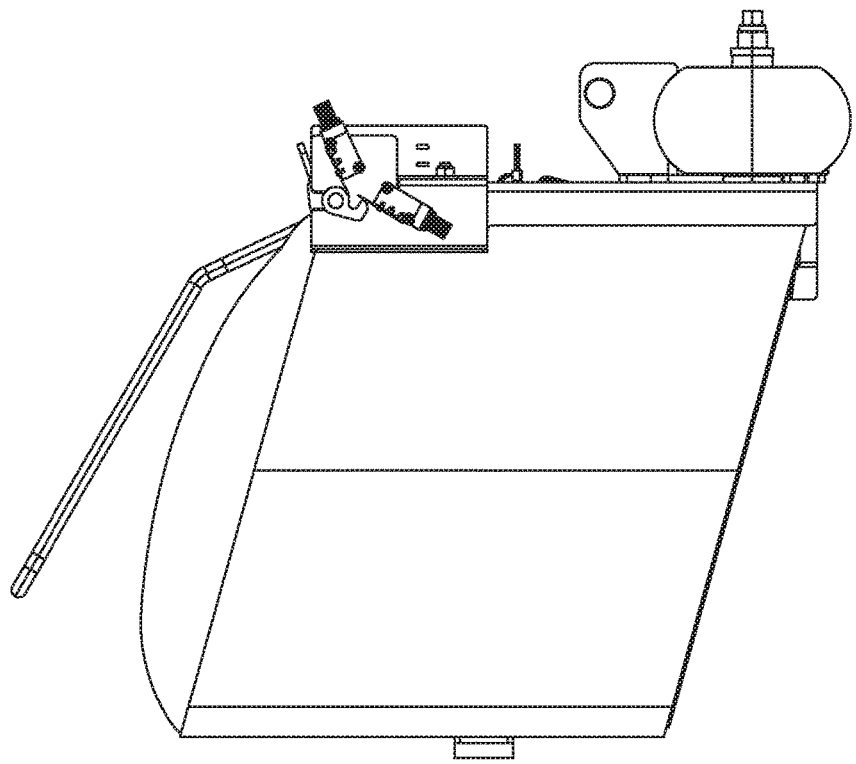
FIG. 18 depicts a front elevation view of the catching assembly coupled to a cutting deck of the mower of FIG. 10 where the cover has been removed to show contact between the flange and the switches of FIG. 16 where the catcher is in the catching position, in accordance with aspects hereof.
Figure 21:
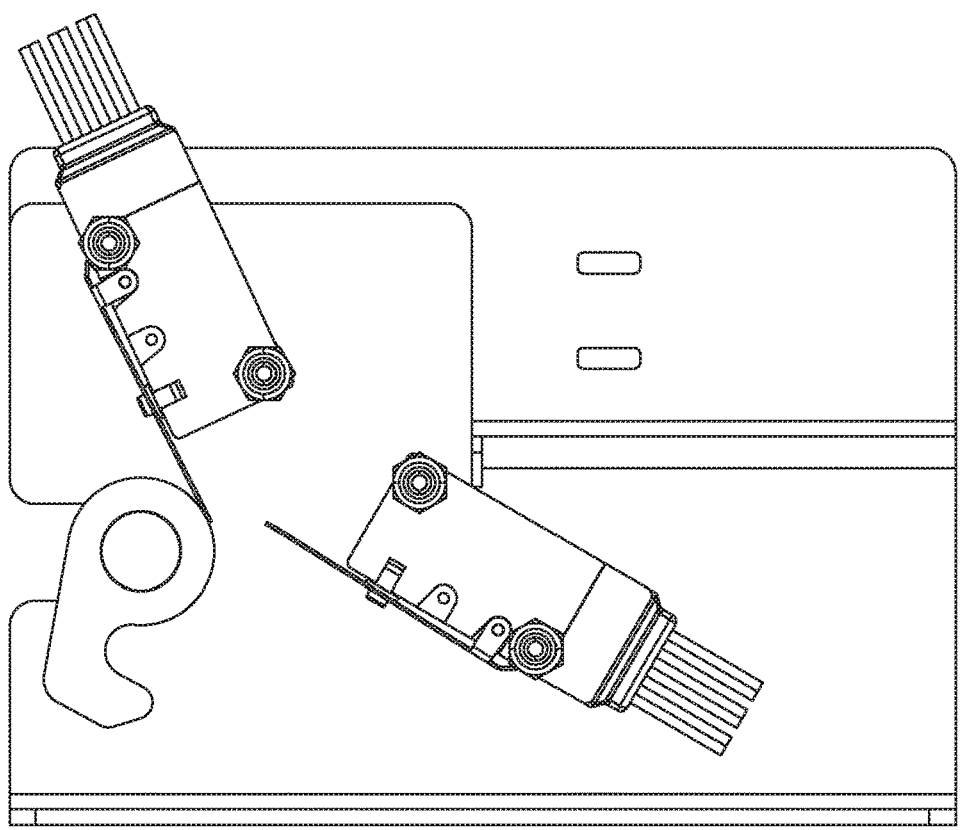
FIG. 21 depicts a detail view of the contact between the flange and one of the switches of FIG. 16 where the catcher is in the dumping position, in accordance with aspects hereof.
Figure 20:
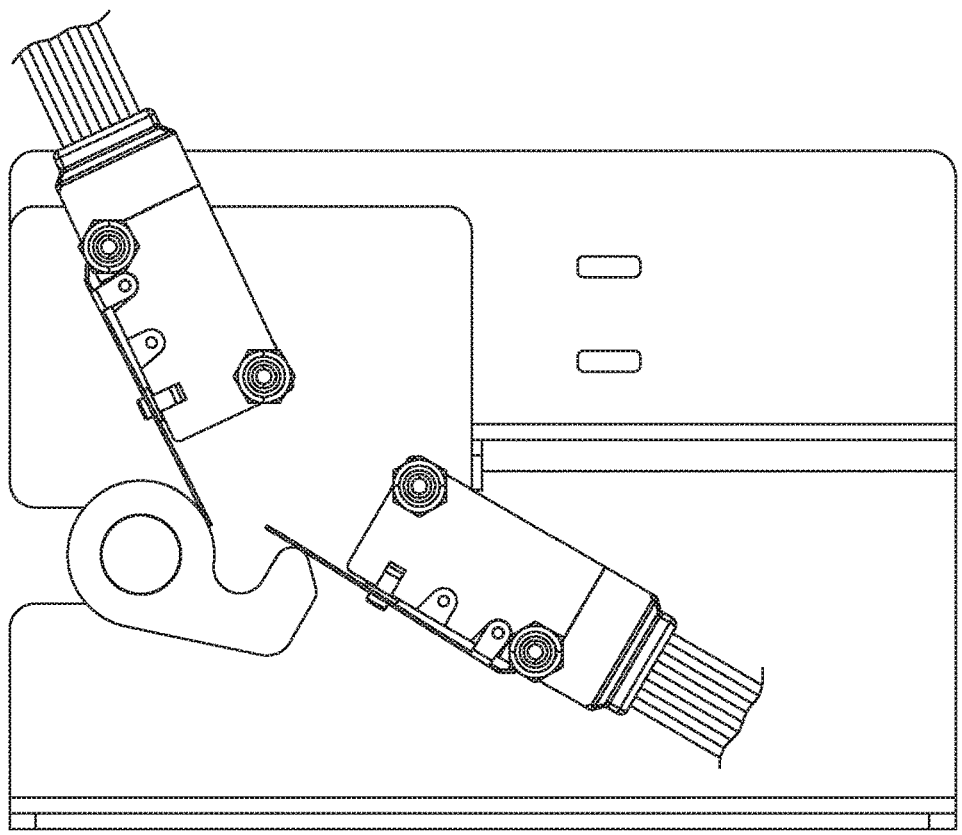
FIG. 20 depicts a detail view of the contact between the flange and the switches of FIG. 16 where the catcher is in the catching position, in accordance with aspects hereof.

Referring to FIG. 12, an electrical diagram illustrates one way to control the power supplied to one or more blades of the cutting deck 10. More specifically, FIG. 12 shows an electrical circuit 200 that includes a clutch switch 202 and a clutch 204. Power supplied to the clutch switch 202 is transmitted to the clutch 204 upon the occurrence of certain conditions (e.g., an operator's presence is detected in a seat of the mower 1). A bag circuit 206 may be spliced into the circuit 200 to provide additional conditions for power to be supplied to the clutch 204. The bag circuit 206 may include two switches in parallel to one another. The first switch is a bag presence switch 208. The bag presence switch 208 may be coupled to the mounting plate 114 and is open when depressed and is closed when not depressed. The crossbar 150 may depress the bag presence switch 208 when the catcher 20 is coupled to the mounting plate 114. The second switch is a bag closed switch 210. The bag closed switch 210 may be coupled to the mounting plate 114 and is closed when depressed and is open when not depressed. The flange 58 may depress the bag closed switch 210 when the catcher 20 is in the catching position. The flange 58 may release the bag closed switch 210 when the catcher 20 is pivoted to the dumping position.

Thus, when the catcher 20 is uncoupled to the mounting plate 114, the bag presence switch 208 is closed and power may be supplied to the clutch 204 through the bag presence switch 208. When the catcher 20 is uncoupled, the bag closed switch 210 is open. After the catcher 20 is coupled to the mounting plate 114, the bag presence switch 208 is open and power may not be supplied to the clutch 204 through the bag presence switch 208. However, if the catcher 20 is in the catching position then the bag closed switch 210 is closed and power may be supplied to the clutch 204 through the bag closed switch 210. If the catcher 20 is then moved towards the dumping position, then the bag circuit 206 is open because both the bag presence switch 208 and the bag closed switch 210 are open.

A cover 212 (best seen in FIGS. 14-16) may enclose the bag presence switch 208 and the bag closed switch 210. A portion of the crossbar 150 and the flange 58 may be received within the cover 212 when the catcher 20 is coupled to the mounting plate 114.

Additionally, although some exemplary implementations of the embodiments described herein are shown in the accompanying figures, these implementations are not intended to be limiting. Rather, it should be understood that the various embodiments and aspects described herein may be implemented upon any mower having a cutting deck and a discharge opening therein.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

What is claimed:

1. A mower convertible from a side-discharge configuration to a bagging configuration, the mower comprising:
    a cutting deck configured to discharge clippings through a first opening in the cutting deck on a first lateral side of the mower;
    a mounting plate coupled to the cutting deck on the first lateral side of the mower, wherein the mounting plate includes a second opening aligned with the first opening in the cutting deck and configured to permit clippings cut by the cutting deck to pass therethrough;
    a discharge chute pivotally coupled to the mounting plate proximate the second opening, the discharge chute movable between a lowered position and a raised position, wherein the lowered position comprises the discharge chute extending from the mower to restrict ingress through the second opening, wherein the raised position comprises the discharge chute pivoted away from the lowered position;
    a catcher removably coupled to the mounting plate, wherein the catcher holds the discharge chute in the raised position when the catcher is coupled to the mower; wherein the discharge chute includes a lip, wherein the lip is held between the mounting plate and the catcher when the discharge chute is in the raised position; and
    a caster wheel rotatably coupled to the mounting plate proximate a forward edge of the mounting plate.

2. The mower of claim 1, wherein the discharge chute is perpendicular to the mounting plate when in the lowered position, wherein the discharge chute is parallel to the mounting plate when in the raised position.

3. The mower of claim 1, wherein the catcher includes a wire frame structure surrounded by a bag comprised of a fabric, wherein the bag includes a third opening for receiving clippings.

4. The mower of claim 3, wherein the wire frame structure couples to the mounting plate such that clippings discharged through the second opening in the mounting plate pass through the third opening into the catcher.

5. The mower of claim 4, wherein the catcher is pivotally coupled to a top portion of the mounting plate, wherein a handle of the catcher may rotate the catcher about the top portion of the mounting plate.

6. The mower of claim 1, wherein the discharge chute is substantially enclosed within the catcher when the discharge chute is in the raised position.

7. A catching assembly allowing an operator of a mower to select between a side-discharge configuration and a bagging configuration, the catching assembly comprising:
    a mounting plate having a first opening and configured to couple to the mower such that clippings discharged by the mower pass through the first opening;
    a catcher having a bag surrounding a frame, the catcher removably coupled to the mounting plate by the frame;
    a discharge chute movably coupled to the mounting plate proximate the first opening, wherein when in the side-discharge configuration the discharge chute extends laterally from the mounting plate and the catcher is uncoupled from the mounting plate, wherein when in the bagging configuration the catcher is coupled to the mounting plate and the discharge chute is held away from the first opening by the catcher,
    wherein the bag includes a second opening that is larger than the first opening, wherein the mounting plate is sized to cover a portion of the second opening that extends beyond the first opening,
    wherein the frame includes a crossbar that extends along a top edge of the second opening and is received in two or more pivotal mountings on the mounting plate,
    wherein the catcher includes a handle extending perpendicular to the crossbar for rotating the catcher between a catching position where the mounting plate covers the second opening and a dumping position where clippings held in the bag may be dumped out through the second opening,
    wherein the crossbar holds a lip of the discharge chute against the mounting plate while the catcher rotates between the catching position and the dumping position in the bagging configuration.

8. The catching assembly of claim 7, wherein the bag includes a catching chamber separated from an air passageway by an interior fabric panel, wherein the catching chamber receives clippings that pass through the second opening.

9. The catching assembly of claim 8, wherein the side discharge chute is within the catcher in the bagging configuration.

10. A riding mower having selectable operation between a side-discharge configuration and a bagging configuration, the mower comprising:
    a cutting deck having one or more blades and a discharge opening on a first side;
    a power source for turning the one or more blades;
    a clutch system between the power source and the one or more blades for engaging and disengaging the one or more blades to power supplied by the power source, wherein the one or more blades rotate by power from the power source when the clutch system is engaged, wherein the one or more blades do not rotate by power from the power source when the clutch system is disengaged;
    a discharge chute pivotally coupled to the mower proximate the discharge opening, the discharge chute movable between a deployed position and a retracted position;
    a catcher removably, and pivotally, coupled to the mower, the catcher having a handle for pivoting the catcher between a catching position and a dumping position, wherein the discharge chute is in the retracted position when the catcher is coupled to the mower;
a first sensor coupled to the mower and configured to detect if the catcher is coupled to the mower; and
a second sensor coupled to the mower and configured to detect if the catcher is in the dumping position,
wherein upon the first sensor detecting the catcher being coupled to the mower and the second sensor detecting the catcher being in the dumping position the clutch system disengages the one or more blades from the power supplied by the power source,
wherein the catcher includes an intake opening having a perimeter, wherein the perimeter of the intake opening is adjacent to a mounting plate when the catcher is in the catching position and at least a portion of the perimeter of the intake opening is pivoted away from the mounting plate when the catcher is in the dumping position,
wherein the second sensor comprises a second switch, wherein the second switch is closed when the perimeter of the opening is adjacent to the mounting plate and the second switch is open when at least a portion of the perimeter of the opening is pivoted away from the mounting plate, wherein the clutch system disengages the one or more blades from the power supplied by the power source when the second switch is open.

11. The mower of claim 10, wherein the catcher further comprises a crossbar and the catcher is coupled to the mower by the crossbar when received in a pivotal mounting positioned proximate a top edge of the mounting plate.

12. The mower of claim 11, wherein the first sensor comprises a first switch, wherein the first switch is closed when the crossbar is received in the pivotal mounting and the first switch is open when the crossbar is not received in the pivotal mounting, wherein the clutch system disengages the one or more blades from the power supplied by the power source when the first switch is open.

* * * * *